Patented June 3, 1947

2,421,590

UNITED STATES PATENT OFFICE 2,421,590

TREATMENT OF SULPHITE PULP AND LIQUOR

Johan Åström, Nyhamn, Essvik, Sweden, assignor to Svenska Cellulosa Aktiebolaget, Stockholm, Sweden, a corporation of Sweden No Drawing. Application November 24, 1943, Serial No. 511,641. In Sweden July 8, 1942

2 Claims. (Cl. 92—11)

In the reclaiming of values from sulphite waste liquor various methods are used, in which the waste liquor is drawn off by displacement and washing with dilute waste liquors (weak liquors) and water. The object of this washing is to recover the greatest possible quantity of waste liquor with the slightest possible dilution of the liquor in order thus to arrive at the highest possible sugar concentration in the subsequent fermentation of the liquor.

The contents of organic matter in the residual liquor remaining after fermentation and the removal by distillation of the alcohol (said residue being referred to as "dregs" in the following disclosure) may, after evaporation, be utilized by burning. In order to render this evaporation and burning process profitable the contents of dry matter of the dregs should be as high as possible. Even if, as indicated above, the dilution due to the washing-out of the sulphite liquor is as slight as practicable, the dry matter contents of the dregs will be relatively low. It has therefore been proposed to divide the sulphite liquor from the digester house into two portions, viz. on the one hand undiluted liquor directly drawn off from the digester, and on the other hand liquor diluted by water used for washing, each portion to be neutralized and fermented separately. According to the proposal the liquor remaining after the fermentation of the first-mentioned undiluted portion and the removal of the alcohol (i. e. the dregs) was subsequently to be evaporated and burnt. This procedure has, however, many disadvantages since it involves the dividing of the alcohol plant into two sections.

By means of the present invention these inconveniences may be eliminated, a higher percentage of dry matter in the said dregs may be obtained and a major portion of said dregs may be utilized for evaporation and burning. The invention is mainly characterized in that the water usually employed in the displacement or washing out of the sulphite liquor is entirely or in part substituted by dregs, i. e. waste sulphite liquor which has been fermented and free from at least a substantial portion of the alcohol thus formed.

By this method the concentration of dry matter in the dregs obtained after carrying out the procedure will be considerably higher than that obtained when the liquor is displaced by means of water in the usual manner, whereby evaporation and burning on an economical basis is rendered possible. The percentage of fermentable sugar will not increase, though the contents of other organic matter will, including pentoses and other sugars not fermentable with ordinary yeast (Saccharomyces). If the said dregs are to be used for the manufacture of Torula yeast from pentoses the additional advantage of an increased yield of yeast per unit of volume is gained. Moreover, the dregs contain small quantities of alcohol which are normally lost, but according to the present invention some of it is recovered, due to the fact that part of the dregs will pass again through the liquor column. It should also be noted that dregs leaving an indirectly heated driving-off column always have a higher percentage of dry matter than has unfermented sulphite waste liquor (the alcohol-fermentable sugar not included), because a certain spontaneous evaporation takes place when the liquor is cooled in cooling towers and a certain amount of water is driven off in the liquor column in connection with the distillation. According to the present invention a washing process may therefore be carried out with a liquid, i. e. dregs, which has the same percentage of dry matter as liquor to be displaced, or even higher. For reasons which will be readily understood this is completely out of the question when ordinary sulphite waste liquor is used as washing, purging or displacing medium. Moreover, this concentration is effected without any additional supply of heat.

The invention will be described more fully hereinbelow with reference to the following example.

At the completion of a cook the digester having a capacity of 150 m.³ contained about 110 m.³ of undiluted sulphite liquor. The latter was drawn off through the bottom valve while simultaneously pumping into the digester at its top about 80 m.³ of weak liquor of a relatively high concentration from the weak liquor tanks. 80 m.³ weak liquor of a relatively low concentration were then fed into the digester in similar manner. In this way a quantity of about 135 m.³ sulphite liquor was drawn off, which went to the alcohol plant. Then 60 m.³ of dregs admixed with 100 m.³ of wash water which has run off from the stuff chest were pumped into the digester (in lieu of water or a third strongly diluted weak liquor, such as that obtained from the final washing of the pulp in the stuff chest). It is preferred to admit the dregs first and the wash water afterwards. At the same time about 80+80 m.³ of weak liquor were withdrawn through the bottom valve for filling up the weak liquor tanks. The contents of the digester were subsequently discharged into the stuff chest and flushing was effected preferably by means of wash water from the chest. In the chest the pulp was subjected to a final washing with pure water. Of the dreg-containing wash water run off from the chest during the discharging and the washing steps the first 150 m.$^3$ were collected. Since the total quantity of dregs per cook is about 130 m.$^3$ and 60 m.$^3$ are required for the washing step, about 70 m.$^3$ may be withdrawn for evaporation and burning.

In a plant employing the above described washing method with the use of dregs the percentage of dry matter of the dregs was increased to 11% in comparison with only 8% when using water as washing medium. This means that the quantity of water per kilogram of dry matter which must be evaporated to attain complete dryness was reduced to $$\frac{100-11}{11} = 8.1 \text{ kgs.}$$

as against $$\frac{100-8}{8} = 11.5 \text{ kgs.}$$

in the latter case.

Naturally, the quantity of dregs used for washing may be varied according to the result desired. Also the previous washing with weak liquors may of course be effected with a varying number of weak liquors of various concentrations and in various quantities. In case the sugar concentration of the liquor in the alcohol plant is of secondary interest, the main interest attaching to the percentage of dry matter of the dregs, the washing by means of the dregs may be carried out prior to or during the washing by means of weak liquors.

The methods above disclosed are also applicable in cases where the washing of the sulphite pulp takes place wholly or in part outside the digester, e. g. in diffuser tanks, blow pits or chests. Where additional dregs from other plants are obtainable the quantity of dregs used for evaporation may be increased.

What I claim is:

1. In the manufacture of sulphite cellulose, the method of washing sulphite waste liquor from the sulphite pulp which comprises displacing sulphite waste liquor from said pulp by addition thereto of a distillery slop obtained as dregs from the distillation of alcohol from a fermented sulphite waste liquor, said distillery slop having substantially the same solids content as the unfermentable solids content of said sulphite waste liquor to be displaced from the sulphite cellulose.

2. The washing method defined in claim 1, characterized in that the pulp washing treatment is divided into at least two steps of which one is said displacing step and another consists in washing said pulp with an admixture of said dregs with a diluent of the group consisting of water and unfermented dilute sulphite waste liquor.

JOHAN ÅSTRÖM.

REFERENCES CITED

The following references are of record in the file of this patent:

UNITED STATES PATENTS

| Number | Name | Date |
|---|---|---|
| 1,284,740 | McKee | Nov. 12, 1918 |
| 1,809,427 | Spon | June 9, 1931 |
| 1,881,557 | Wolfgang | Oct. 11, 1932 |
| 2,228,628 | Hahn | Jan. 14, 1941 |
| 495,956 | Bradley | Apr. 25, 1893 |
| 1,778,381 | Cuker | Oct. 14, 1930 |
| 2,206,024 | Brown | July 2, 1940 |

OTHER REFERENCES

Chemical Abstracts, volume 36, pages 3044$^6$ and 6798$^{5,6}$.

Chemical Abstracts, volume 30, page 6229$^4$.

Paper Trade Journal, Feb. 22, 1931, page 51.